US010901919B2

(12) United States Patent
Disegni et al.

(10) Patent No.: US 10,901,919 B2
(45) Date of Patent: Jan. 26, 2021

(54) CIRCUIT AND METHOD FOR MANAGING ACCESS TO MEMORY

(71) Applicant: STMicroelectronics S.r.l., Agrate Brianza (IT)

(72) Inventors: Fabio Enrico Carlo Disegni, Spino d'Adda (IT); Federico Goller, Turin (IT); Michele Febbrarino, Bagheria (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 33 days.

(21) Appl. No.: 16/455,155

(22) Filed: Jun. 27, 2019

(65) Prior Publication Data

US 2019/0317902 A1 Oct. 17, 2019

Related U.S. Application Data

(63) Continuation of application No. 15/797,940, filed on Oct. 30, 2017, now Pat. No. 10,387,334.

(30) Foreign Application Priority Data

Mar. 29, 2017 (IT) .................. 102017000034731

(51) Int. Cl.
*G06F 12/14* (2006.01)
*G06F 13/16* (2006.01)
*G06F 12/02* (2006.01)

(52) U.S. Cl.
CPC ...... *G06F 12/1425* (2013.01); *G06F 12/0246* (2013.01); *G06F 13/1663* (2013.01); *G06F 2212/1052* (2013.01); *G06F 2212/7207* (2013.01)

(58) Field of Classification Search
None
See application file for complete search history.

(56) References Cited

U.S. PATENT DOCUMENTS

| 2007/0198768 | A1 | 8/2007 | Kim et al. |
| 2008/0140896 | A1 | 6/2008 | Todoroki et al. |
| 2009/0300017 | A1 | 12/2009 | Tokusho et al. |
| 2014/0281283 | A1 | 9/2014 | Shacham et al. |
| 2015/0293793 | A1 | 10/2015 | Vrind et al. |
| 2016/0054780 | A1 | 2/2016 | Bodas et al. |

FOREIGN PATENT DOCUMENTS

GB 2488516 A 9/2012

*Primary Examiner* — Kevin Verbrugge
(74) *Attorney, Agent, or Firm* — Slater Matsil, LLP

(57) ABSTRACT

A circuit, for managing operations for accessing a flash memory on the basis of requests received from a main CPU and from an auxiliary CPU, may be configured to: associate with the main CPU, a higher access priority to the flash memory than the access priority of the auxiliary CPU; command, in the absence of further requests for accessing the flash memory, the access to the flash memory for the main or auxiliary CPU which has initiated a first access request; verify, following a receipt of a second access request, the access priority associated with this second access request; suspend one of the first or the second access request having lower priority; and authorize the other of the first or the second access request having higher priority.

20 Claims, 5 Drawing Sheets

CIRCUIT AND METHOD FOR MANAGING ACCESS TO MEMORY

CROSS-REFERENCE TO RELATED APPLICATIONS

The present application is a continuation of U.S. application Ser. No. 15/797,940, filed on Oct. 30, 2017, which claims priority to Italian Patent Application No. 102017000034731, filed on Mar. 29, 2017, which applications are hereby incorporated by reference herein in their entirety.

TECHNICAL FIELD

The present disclosure relates generally to memory (e.g. non-volatile memory, for example, flash memory), and in particular embodiments, to a circuit and method for managing operations for access to a memory.

BACKGROUND

A flash memory is written (programmed or erased) on the basis of respective commands issued by a processor to a controller which is interfaced with the flash memory. When a plurality of processors have to carry out programming and/or erase operations on the same flash memory, problems of sharing of the memory resource arise, which prevent the access to the latter by a processor when the memory is dedicated to another processor.

In these cases, it is usual to dedicate the memory to one processor at a time, notifying the other processors of the impossibility of using the memory resource. A system for management of the conflicts is thus implemented in order to allow the access to the memory for one processor at a time. This management of the memory does not, however, duly take into consideration differences in priority of the requests for writing to the memory coming from the various processors.

SUMMARY

According to one embodiment, the management of the requests for accessing the memory for programming/erase operations is typically carried out by a state machine at the hardware level. Such a solution, however, is inefficient in that the use of a hardware state machine makes it complicated to apply modifications to the latter, or to restore its functionality in the case of a failure.

The aim of the present disclosure is to provide a circuit and a method for managing operations for access to a memory which overcome the aforementioned drawbacks.

According to the present disclosure, a circuit and a method are implemented for managing operations for access to a memory.

BRIEF DESCRIPTION OF THE DRAWINGS

For a better understanding of the present disclosure, some preferred embodiments will now be described, purely by way of non-limiting example, with reference to the appended drawings, in which.

DETAILED DESCRIPTION OF ILLUSTRATIVE EMBODIMENTS

Figure 1:
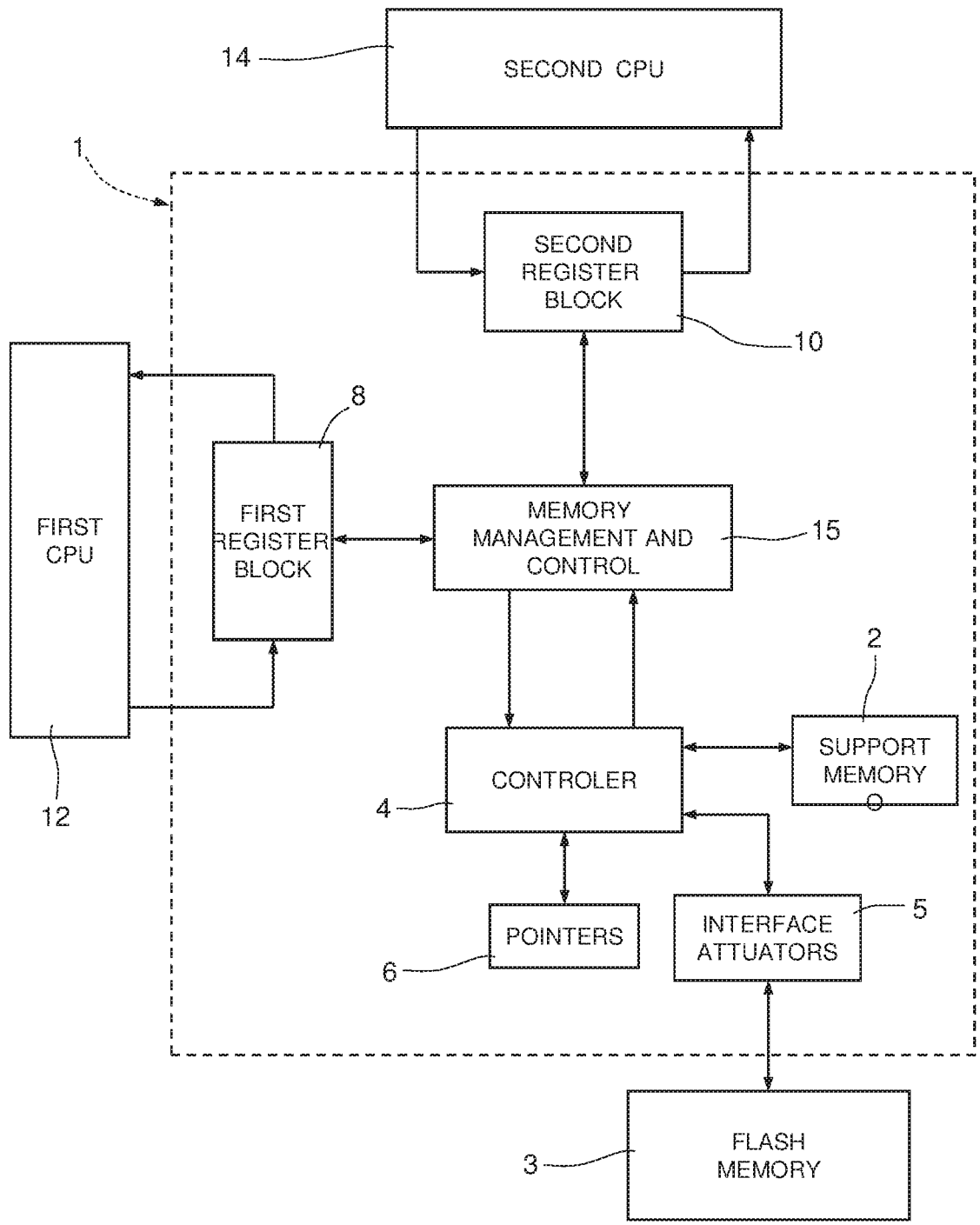
FIG. 1 illustrates a device for managing the access, for programming and erase operations, to a memory according to an embodiment.

FIG. 1 illustrates a block diagram of a circuit 1 for managing the access to a memory 3. The circuit 1 has the function of interface between a plurality of processing units (CPUs) 12, 14 and the memory 3.

The memory 3 is, in particular, of the non-volatile type, even more particularly a memory of the Flash type which, in use, is written (programmed) or erased on the basis of requests coming from the CPU 12, 14.

According to an embodiment, a programming/erase controller (also known as PEC) 4 is operationally coupled to the memory 3 in order to execute programming and erase operations for the latter. The controller 4 operates as an interface between the processing unit 12, 14 and the memory 3. The controller 4 is of the programmable type, and is, in particular, configured for executing programming and erase subroutines stored in a support memory 2 coupled to it for example by actuators (in other words interface registers) 5, in a manner known per se. The actuators 5 are, in particular, registers that contain control bits which act directly on the circuit blocks of the memory 3. They operate for example so as to address a specific column and row of the memory array 3, to enable a reference voltage in devices for reading the memory 3, to enable a voltage higher than the standard one in row and column decoders of the memory 3, to enable the generation of the programming or erase pulse within the selected memory cells, etc.

Furthermore, a pointer memory 6, operationally coupled to the controller 4, cooperates with the controller 4 in order to control the access to specific areas of the support memory 2 on the basis of pointers stored in the pointer memory 6.

The support memory 2 is of the volatile type (e.g. a RAM) and contains the data block and the instructions, in machine language, interpreted and executed by the controller 4 in order to manage the access to the memory 3 in programming and erase operations.

The operations for programming/erasing a memory take place in a manner known per se and thus are not described in detail here.

The circuit 1 furthermore includes a first register block 8 and a second register block 10, configured for storing requests for writing and erasing the memory 3 coming from the first CPU 12 and, respectively, from the second CPU 14. For this purpose, therefore, the first register block 8 is configured so as to be coupled to the first CPU 12, whereas the second register block 10 is configured so as to be coupled to the second CPU 14. The first and the second register blocks 8, 10 also have the function of storing the state information coming from the memory 3 for the completion of the aforementioned programming/erase operations. This state information is, for example, of the binary type, in which a first value identifies the completion of the programming/erase operation, and a second value indicates that the programming/erase operation has not yet been completed. The first and the second CPU 12, 14 therefore have access, by the first and the second register blocks 8, 10, to the information relating to the completion or otherwise of their request for programming/erasing the memory 3.

A memory management and control block 15 forms an interface for the exchange of data between the first and the second CPU 12, 14 and the memory 2. More particularly, the memory management and control block 15 is interfaced with the first and the second register block 8, 10 from which it acquires the information relating to the programming/erase commands coming from the CPU 12, 14, and in which it stores the state information relating to the completion of the respective programming/erase operations. Furthermore, the memory management and control block 15 is interfaced with the controller 4, to which it sends the boot commands for the programming/erase operations on the memory 3 and from which it receives information relating to the execution of the programming/erase operations on the memory 3 stored in the support memory 2.

Furthermore, the memory management and control block 15 is responsible for reserving the space in the memory 2 for storing all the information useful for the write (programming) phase of the memory 3. In this context, the pointer memory 6 stores the physical addresses of the support memory 2, in such a manner that the controller 4 has this information available both at the start of the programming operation and during the programming operation itself (updated address). The controller 4 can, accordingly, access the programming and erase subroutines stored in the support memory 2, interrupt the execution of this subroutine and resume the execution of the subroutine from the point of the previous interruption, according to needs and as better illustrated in the following.

The information relating to the memory address 3 in which the programming operation is taking place and the address of the memory 2 relating to the subroutine which is being executed by the controller 4, are therefore useful for suspending and, successively, resuming the programming operation.

In an analogous manner, the pointer memory 6 stores both the physical addresses of the memory 3 and the data relating to the subroutine of the memory 2, for the operation for erasing the data under the control of the first CPU 12 or of the second CPU 14. Also, in this case, the information relating to the memory address in which the erase operation is taking place, together with the pointers to the subroutine in the memory 2 are useful for suspending and, subsequently, resuming the erase operation.

In use, both the first and the second CPU 12, 14 may make a simultaneous request for programming or erasing the memory 3. In an analogous manner, requests for programming/erasing the memory 3 may arrive at the memory control block 16 from one of the first or the second CPU 12, 14, while the other of the first or the second CPU 12, 14 is in a phase for programming/erasing the memory 3.

According to an embodiment, a method is provided for managing the requests for accessing the memory 3, for the programming and erase phases of the latter, that is transparent to the first and to the second CPU 12, 14. In other words, requests for programming and erasing the memory 3, coming from the first and from the second CPU 12, 14, are always accepted even in the case in which the memory 3 is busy.

Figure 2:
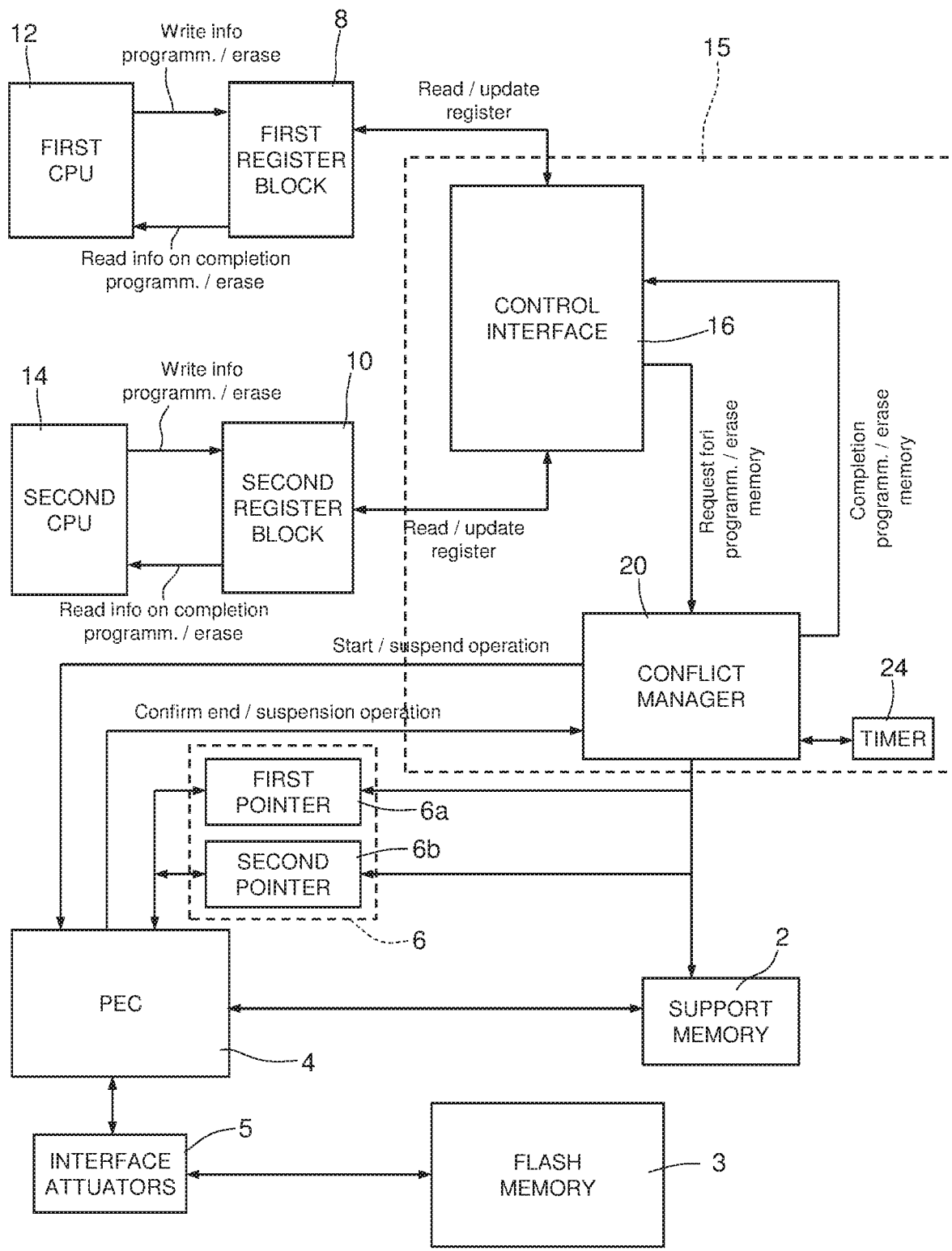
FIG. 2 illustrates a device for managing the access, for programming and erase operations, to a memory according to a further embodiment.

For this purpose, with reference to FIG. 2, the memory management and control block 15 includes a memory control interface block 16 and a conflict management block 20, operationally coupled together, and whose operation is described with reference to the state machine in FIG. 3.

Basically, in order to implement a method for managing the conflicts, the device 1 is configured for: associating, with operations executed by the first CPU 12, a priority for access to the memory 3 which is different from the access priority associated with operations executed by the second CPU 14; commanding, in the absence of any other requests for accessing the memory 3, the access to the memory 3 for one of the first CPU 12 and the second CPU 14 that was the first to send a first access request; verifying (e.g. by a comparison), following a receipt of a second access request by the other of the first CPU 12 and the second CPU 14, the access priority associated with this second access request; suspending (in a manner that is transparent to the first and second CPU 12, 14) one of the first or the second access request; and, authorizing the other of the first or the second access request. The suspension and the authorization of the access to the memory 3 is based on a comparison between the priorities associated with the various requests. For example, the access request associated with a lower priority value is suspended compared with the access request associated with a higher priority value.

The method for managing the conflicts executed by the memory management and control block 15 is here described in detail in the following with joint reference to FIGS. 2 and 3.

The conflict management block 20 will be, in an initial phase in which there are no requests for programming or erasing the memory 3 by the first or by the second CPU 12, 14, in a wait state 100.

When one of the first or the second CPU 12, 14 sends a request for programming or erasing the memory 3 (writing the relevant information in the respective register block 8, 10), this request is acquired by the memory control interface 16 and sent to the conflict management block 20, together with the information relating to which of the first or the second CPU has made a request for accessing the memory 3 (the memory control interface 16 is, in fact, aware of the origin of the request for accessing the memory 3 on the basis of the information acquired by the registers 8 and 10, as previously described). The conflict management block 20 thus goes from the wait state 100 into the interpreter state 102.

In the interpreter state 102, the conflict management block 20 verifies whether the programming or erase request originates from the first CPU 12 or from the second CPU 14.

In the case in which the programming or erase request originates from the first CPU 12, the conflict management block 20 sends a suitable command to the controller 4 and, at the same time, initializes the pointer memory 6 in order to store, and to keep updated, the pointers to the code (stored in the support memory 2) to be executed by the controller 4, throughout the whole operation for programming or erasing the memory 3. The pointer memory 6 includes, for this purpose, a first pointer 6a to the memory 2 dedicated to the operations of the first CPU 12 and a second pointer 6b to the memory 2 dedicated to the operations of the second CPU 14.

Simultaneously with the start of the programming/erase operations on the memory 3 requested by the first CPU 12, a first flag (e.g. a binary value) is enabled which identifies a state of being or not being in the operating condition for programming/erasing the memory 3 under the control of the first CPU 12 (for example, setting the first flag to a logic value "1" or "0", where "1" identifies an active access request and "0" identifies no active access request). The first flag may for example be stored in a memory (not shown) internal to the conflict management block 20.

The system thus goes into a state for controlling the access 104 to the memory 3, in order to carry out the programming or erase operations requested by the first CPU 12. When the programming and erase operations on the memory 3 are finished, it returns to the interpreter state 102.

According to an embodiment, however, during the execution of the programming and erase operations (state 104), the conflict management block 20 remains in a wait state in order to acquire potential commands coming from the memory control interface 16, relating to requests for accessing the memory 3 coming from the second CPU 14. In the case in which the second CPU 14 makes a request for accessing the memory 3 for a programming or erase operation, the start of a timer 24, coupled to the conflict management block 20, is triggered which limits the time spent in the state 104. In this phase, the request for accessing the memory 3 from the second CPU 14 is put into a state of suspension in a manner that is transparent to the second CPU 14. In other words, the request for accessing the memory 3 made by the second CPU 14 is accepted (but temporarily suspended) also in the presence of a "memory busy" (currently used by the first CPU 12). There is therefore only a delay in the operation for access to the memory 3 by the second CPU 14, given substantially by the duration of the interval defined by the timer 24. The timer 24 is, advantageously, of the programmable type, in order to be able to modify, according to needs and as a function of the area of application, the duration of the time interval to be scanned.

When the timer 24 reaches a predefined threshold value (e.g., in the case of the timer counting down, the threshold could be the value 0), the output goes out of the state 104 and into a first arbitration state 106. In the case in which, when the timer 24 reaches the threshold, the programming or erase operations requested by the first CPU 12 have not been completed, these operations are suspended in a safe manner (in other words, in the absence of loss of data—in a manner known per se and not a subject of the present disclosure). The controller 4 is responsible for carrying out the safe suspension operation. However, according to one embodiment, beyond the suspension of the abovementioned operations, the address of the memory 2 relating to the subroutine specific to the management of the operation in question is also stored in the first pointer 6a, together with the address of the memory 2 that contains all the parameters useful to the execution of the operation in question (e.g. address of the memory 3, type of operation from between programming and erase, pointer to a specific phase of the operation in question, etc.), in order to be able to resume, at a later time, the programming/erase operations whenever the latter have been interrupted.

In the first arbitration state 106, the conflict management block 20 verifies whether the suspension of the programming/erase operations of the first CPU 12 has taken place under external control (for example, the user has voluntarily cancelled these operations), or else has been requested following the expiration of the timer 24 (timeout). In the first case (voluntary suspension by the user), it returns to the interpreter state 102 and the first flag signalling the request for accessing the memory 3 by the first CPU 12 is set at the logic value "0" (no active request for accessing the memory). In the second case (suspension through timeout), it goes to a state for controlling the access 108 in order to carry out the programming or erase operations requested by the second CPU 14, and the first flag signalling the request for accessing the memory 3 by the first CPU 12 is held at the logic value "1" (active request for accessing the memory).

The state for controlling the access 108 is analogous to the state for controlling the access 104 but identifies, in this context, operations executed on the memory 3 by the second CPU 14. During the execution of the access to the memory 3 for the programming and erase operations requested by the second CPU 14 (state 108), the conflict management block 20 remains in a wait state so as to acquire potential commands (coming from the memory control interface 16) relating to requests for accessing the memory 3 coming from the first CPU 12. In the case in which the transition from the access control state 104 to the access control state 108 has occurred following a suspension through timeout, the first flag (which signals the request for accessing the memory 3 from the first CPU 12) is held at the logic value "1" (the first CPU 12 has not completed the operations on the memory 3).

Simultaneously with the start of the programming/erase operations on the memory 3 requested by the second CPU 14, a second flag (e.g. a binary value) is enabled that identifies a state of being or not being in the operating condition for programming/erasing the memory 3 under the control of the second CPU 14 (for example, setting the second flag at logic value "1" or "0", where "1" identifies an active access request and "0" identifies no active access request). The second flag may for example be stored in the memory internal to the conflict management block 20, in a similar manner to the first flag.

The time spent in the access control state 108 is, in this case, defined by a respective time interval set by the timer 24, which limits the time spent in the state 108. When the timer 24 reaches a predefined threshold value (e.g. in the case of counting down the threshold could be the value 0), the output goes from state 108 and to a second arbitration state 110. In the case in which, when the timer 24 reaches the threshold, the programming or erase operations requested by the second CPU 14 have not been completed, these operations are suspended in a safe manner (in other words, in the absence of loss of data—in a manner known per se). Accordingly, in this case, the controller 4 is responsible for carrying out the safe suspension operation. According to an embodiment, other than the suspension of the aforementioned operations, the address of the memory 2 relating to the specific subroutine for management of the operation in question, and the address of the memory 2 that contains all the parameters useful to the execution of the operation in question (e.g. address of the memory 3, type of operation between programming and erase, pointer to the phase of the operation in question, etc.) are also stored in the second pointer 6b, in order to be able to resume the programming/erase operations, at a later time, from the address at which the latter had been interrupted. The second flag is held at the value "1" (active request for accessing the memory).

In the second arbitration state no, the conflict management block 20 verifies whether the suspension of the programming/erase operations of the second CPU 14 has taken place under an external control (for example, the user has voluntarily cancelled these operations), or else has been requested subsequent to the expiration of the timer 24 (timeout). In the first case (voluntary suspension by the user), it returns to the interpreter state 102 and the second flag is set to the value "0" (no request for accessing the memory). In the second case (suspension through timeout), it returns to the state for controlling the access 104 in order to resume the programming or erase operations previously requested by the first CPU 12 and temporarily suspended, and the second flag is held at the value "1". The programming or erase operation requested by the first CPU 12 is resumed from the address stored in the first pointer 6a.

In an similar manner to what has been described for the transition from the access control state 104 to the access control state 108, also in this case the second flag at the value "1" identifies a state of suspension of the operations requested by the second CPU 14 and, accordingly, the timer 24 is activated in a similar manner to what has been previously described.

It is clear that, in the case in which the conflict management block 20 is in the wait state 100 or in the interpreter state 102, and it receives a request for accessing the memory 3 from the second CPU 14, it goes from the interpreter state 102 to the state for controlling access 108, maintaining a monitoring for a potential request, from the first CPU 12, for accessing the memory. In the latter case, the timer 24 is activated and the transition from one state to another is carried out according to what has already previously been described.

In the absence of requests for accessing the memory 3, monitored in the interpreter state 102, the system returns to the wait state 100.

There is accordingly a timed access to the memory 3 in order to carry out both the operations requested by the first CPU 12 and the operations requested by the second CPU 14, within respective alternate intervals of time. The access to the memory 3 is, in other words, guaranteed for both the first and the second CPU 12, 14 within respective intervals of time. The timed access to the memory 3 is transparent to the first and to the second CPU 12, 14, which are not informed of a potential "memory busy" state. On the other hand, the respective requests for programming/erasing the memory 3 are always accepted by the memory control interface 16, and the management of the time-sharing mechanism is requested from the conflict management block 20.

According to one aspect of the present disclosure, the first CPU 12 is a main CPU, whereas the second CPU 14 is a secondary or auxiliary CPU; the main CPU and the secondary CPU are associated with different access priorities to the memory 3.

In order to manage appropriately the different access priorities to the memory 3, it is possible to program the timer 24 in such a manner as to associate with the operations (programming or erase) requested by the first CPU 12 a time interval that is longer compared with the corresponding time interval allocated to the operations (programming or erase) requested by the second CPU 14.

Furthermore, or alternatively, it is possible to manage the programming operations in a manner different from the operations for erasing the memory 3. For example, according to one aspect of the present disclosure, the programming operations requested by the first CPU 12 (main CPU), are always completed, even in the case where the second (secondary) CPU 14 makes a request for accessing the memory 3. In this case, the timer 24 is not activated. On the contrary, the erase operations requested by the first CPU 12 (main CPU) are suspended (by a countdown with a timer 24) in the case in which the second (secondary) CPU 14 makes a request for accessing the memory 2.

Figure 3:
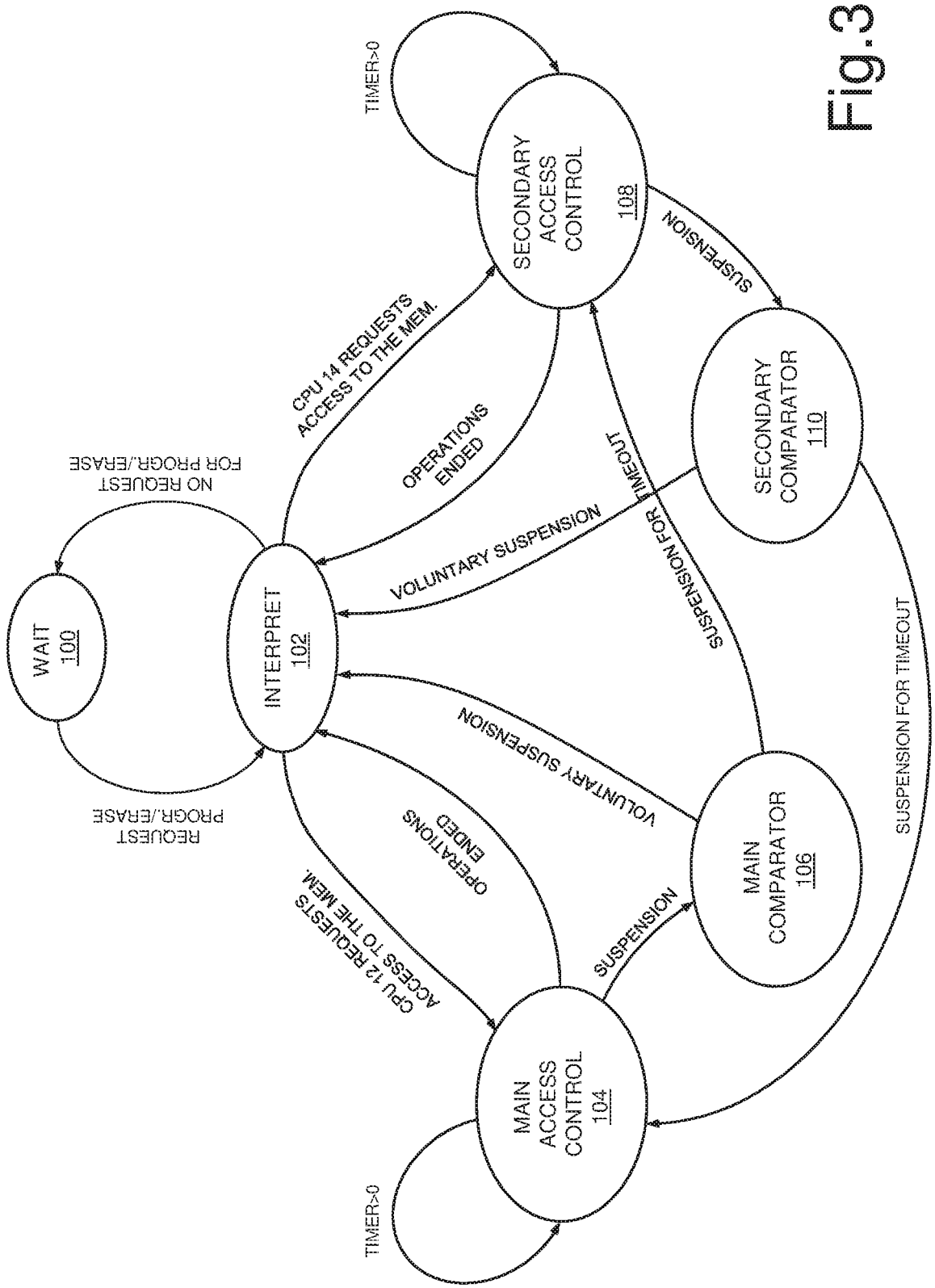
FIG. 3 illustrates, by a state diagram, phases of a method for managing the access to the memory, according to an embodiment.

In a similar manner, it is possible to set the state machine in FIG. 3 in such a manner that the programming operations requested by the second CPU 14 (secondary CPU) are always completed, even in the case in which the first (main) CPU 12 makes a request for accessing the memory 3. In this case, the timer 24 is not activated. Instead, the erase operations requested by the second (secondary) CPU 14 are suspended (by a countdown with a timer 24) in the case in which the first (main) CPU 12 makes a request for accessing the memory 3.

The management and the programming of the timer 24 is however free and may be modified according to the operating environment and to the specific needs required by the specific application.

The management of the access to the memory 3 by the first and by the second CPU 12, 14 is therefore freely configurable in order to duly take into account a different priority that may be assigned or associated with the requests coming from the first and from the second CPU 12, 14. In the phase 104 in FIG. 3, a decision phase (e.g. operation for comparison of the priorities associated with the requests for accessing the memory 3) is carried out in order to define the successive operations for activation of the timer 24 and/or for transition to the arbitration phase 106. Similarly, also in the phase 104 in FIG. 3, a decision phase (e.g. operation for comparison of the priorities associated with the requests for accessing the memory 3) is carried out in order to define the successive operations for activation of the timer 24 and/or for transition to the arbitration phase no.

For example, in the case in which the operation is in the phase 108 and a request for accessing the memory is received from the first CPU (main CPU, whose access requests have a higher priority compared with the access requests from the secondary CPU), the timer 24 is reset to a value "N" (e.g. 5 ms), in order to carry out the safe suspension of the operations executed by the second CPU. In contrast, still in the framework of the example in question here, in the case in which the operation is in the phase 104 and a request for accessing the memory is received from the second CPU (secondary CPU, whose access requests have a lower priority compared with the access requests from the main CPU), the timer 24 is reset to a higher value of "N", e.g. "10N" (here, 50 ms) and the forced suspension of the operations executed by the first CPU is carried out.

FIGS. 4A-4D illustrate examples of management of the timing of the programming and erase phases of the memory 3, in a manner that is transparent to the first and to the second CPU 12, 14 and in order to avoid conflicts of concomitant requests for access to the memory 3.

Figure 4A:
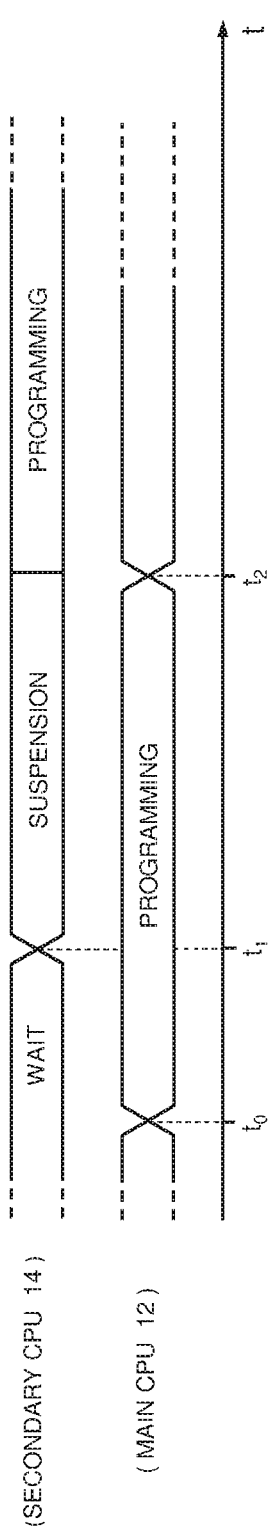
FIGS. 4A-4D show examples of the method for managing the access to the memory, under respective operating conditions.

FIG. 4A illustrates an operating condition in which the first CPU 12 has made a request for programming the memory 3 at the time to, in the absence of previous or concomitant requests from the second CPU 14. The programming phase of the memory 3 is thus initiated, in a manner known per se. At the time t1>t0, during the programming of the memory 3 by the first CPU 12, the second CPU 14 requests the access to the memory 3 for a programming phase. In this example, the programming is completed without starting the timer 24. The request by the second CPU 14 is put into a state of temporary suspension. At the time t2, the programming is terminated, and it is thus possible to start the programming of the memory 3 by the second CPU 14.

Figure 4B:
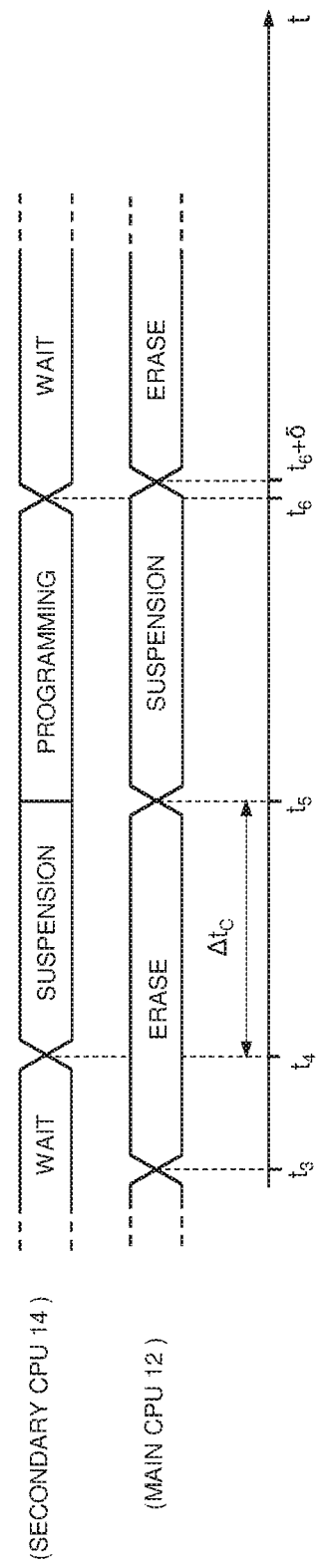

FIG. 4B illustrates an operating condition in which the first CPU 12 has made a request for erasing the memory 3 at the time t3, in the absence of previous or concomitant requests from the second CPU 14. The erase phase of the memory 3 is thus initiated, in a manner known per se. At the time t4>t3, during the erasing of the memory 3 by the first CPU 12, the second CPU 14 requests the access to the memory 3 for a programming phase.

In this example, the programming requests from the second CPU 14 have priority over the erase requests from the first CPU 12 and, accordingly, the timer 24 is activated (countdown time interval Δtc, for example equal to a few milliseconds, e.g. between 4 and 10 ms, in particular 5 ms). The request by the second CPU 14 is put into a state of temporary suspension. At the time t5=t4+Δtc, the erase phase controlled by the first CPU 12 is suspended and the programming of the memory 3 by the second CPU 14 is started.

In this example, the phase for programming the memory 3 by the second CPU 14 has absolute priority over the phase for erasing the memory 3 by the first CPU 12 and, accordingly, the programming is taken to completion without starting the timer 24. The programming phase terminates at the time t6. It is thus possible to restart the erase phase of the memory 3 previously suspended, as illustrated at the time t6+δ (where δ represents a generic delay, e.g. computational, for the transition from one operating condition to another).

Figure 4C:
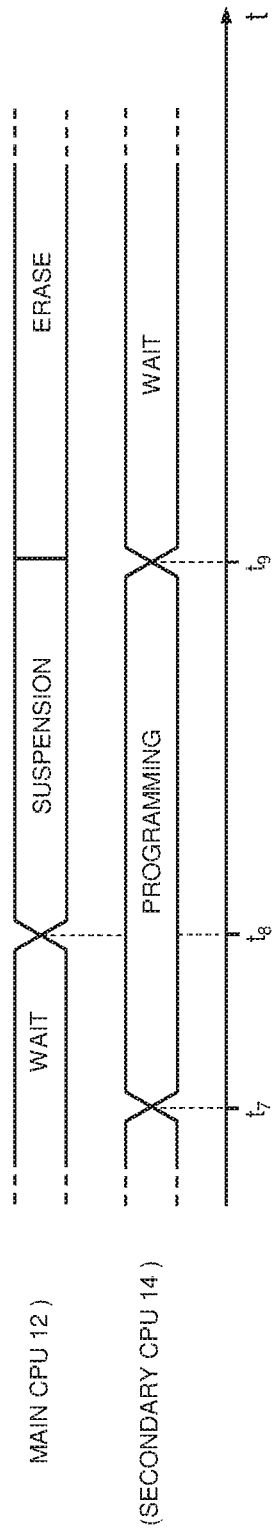

FIG. 4C illustrates an operating condition in which the second CPU 14 has made a request for programming the memory 3 at the time t7, in the absence of previous or concomitant requests from the first CPU 12. The programming phase of the memory 3 is thus initiated, in a manner known per se. At the time t8>t7, during the programming of the memory 3 by the second CPU 14, the first CPU 12 requests the access to the memory 3 for an erase phase. In this example, the erase requests coming from the first CPU 12 do not have absolute priority over the programming requests coming from the second CPU 14 and, accordingly, the programming is taken to completion without the timer 24 being started. The request by the first CPU 12 is put into a state of temporary suspension. At the time t9, the programming is terminated, and it is thus possible to start the erasing the memory 3 by the first CPU 12.

Figure 4D:
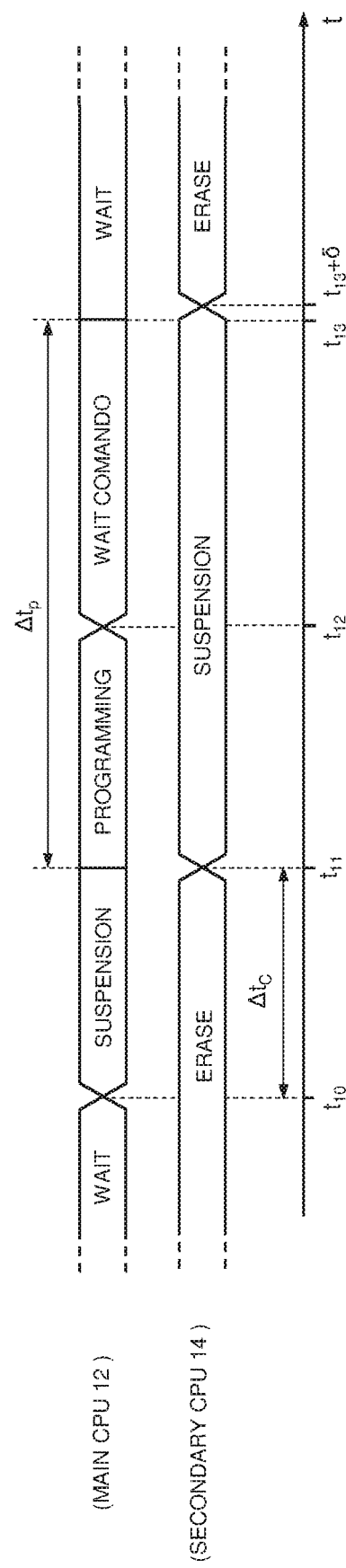

FIG. 4D illustrates one operating condition in which the second CPU 14 has made a request for erasing the memory 3 in the absence of previous or concomitant requests from the first CPU 12. The erase phase of the memory 3 is thus initiated, in a manner known per se. At the time t10, during the erasing of the memory 3 by the second CPU 14, the first CPU 12 requests the access to the memory 3 for a programming phase.

The timer 24 is activated (countdown time interval Δtc, for example equal to 5 ms) in order to allow the first CPU 12 to access the memory 3 with a predefined maximum delay (here, Δtc). The request by the first CPU 12 is put into a state of temporary suspension. At the time t11=t10+Δtc, the erase phase controlled by the second CPU 14 is suspended and the programming of the memory 3 by the first CPU 12 is triggered.

In this example, the programming phase of the memory 3 by the first CPU 12 has absolute priority over the erase phase of the memory 3 by the second CPU 14 and, accordingly, at the time t11, the timer 24 is activated. The memory 3 remains dedicated to the first CPU 12 for the entire time defined by the timer 24, in this example for the time interval Δtp (for example equal to a few tens of milliseconds, e.g. between 30 and 70 ms, in particular 50 ms). Here, the programming is ended at the time t12, before the end of the time interval Δtp. The system therefore remains in a wait state for further programming commands coming from the first CPU 12, in the presence of which a new programming of the memory 3 begins (e.g. restarting the timer 24 with an interval Δtp or with a different interval, or else disabling it and bringing the potential further programming phase to an end).

At the end of the time Δtp, and in the absence of further programming commands coming from the first CPU 12 (time t13), the erase operation on the memory 3, commanded by the second CPU 14 and previously suspended, is restarted (time t13+δ where δ is the delay for the transition from one operating condition to another).

The advantages offered by the present disclosure will be apparent from the preceding description. In particular, the disclosure provides for the controller block 4 (PEC) to be of the programmable type, and for the other blocks (e.g. control interface 16 and conflict management block 20) to be configurable and able to be modified according to needs in order to adapt them to application contexts that are different from one to another.

The programmability of the controller 4, which operates as an interface for the programming of the memory 3, allows corrections and software patches to be implemented in a quick and efficient manner.

Furthermore, the solution provided does not require the use of an interrupt controller. Moreover, the circuit 1 according to the present solution does not require modifications either to the memory or to the CPU that access this memory, and its operation is transparent to both.

Finally, it is clear that modifications and variants may be applied to the disclosure and illustrated here without however straying from the scope of protection of the present disclosure.

For example, the circuit 1 may be configured in such a manner as to be coupled to any given number of CPUs, greater than two. In this case, it is appropriate to provide a respective number of input registers (analogous to the registers 8 and 10), each of them being dedicated to a respective CPU. The conflict management block 20 is, in this case, programmed to manage the access requests from all the CPUs within respective non-overlapping intervals of time, in a similar manner to what has been previously described.

What is claimed is:

1. An interface circuit for managing access to a memory shared between a first processor and a second processor, the interface circuit comprising:
   a timer circuit configured to limit a time interval for access to the memory by the first processor and the second processor, the timer circuit comprising a countdown time interval; and
   a conflict manager circuit configured to:
      determine that a first request to access the memory is originating from the first processor;
      initialize the interface circuit to allow the first processor to access the memory and to prevent the second processor from accessing the memory;
      receive a second request to access the memory by the second processor during an execution of a programming and erase subroutine by the first processor;
      initiate a countdown time interval using the timer circuit during which the second processor is notified that the second request is accepted and the second request is placed in a state of suspension until an end of the countdown time interval; and
      initialize the interface circuit to allow the second processor to access the memory based on determining the end of the countdown time interval and a successful suspension of the execution of the programming and erase subroutine by the first processor.

2. The interface circuit of claim 1, further comprising:
   a first register block configured to store requests for accessing the memory from the first processor; and
   a second register block configured to store requests for accessing the memory from the second processor.

3. The interface circuit of claim 2, wherein the conflict manager circuit receives the first request from the first register block and the second request from the second register block.

4. The interface circuit of claim 1, further comprising a programming/erase controller (PEC) configured to execute programming and erase subroutines used to program and erase blocks of the memory shared between the first processor and the second processor.

5. The interface circuit of claim 4, further comprising a support memory configured to store programming and erase subroutines used to respectively program and erase blocks of the memory shared between the first processor and the second processor.

6. The interface circuit of claim 5, further comprising a pointer memory configured to:
store a physical address of the support memory; and
provide the programming and erase subroutines stored in the support memory to the PEC.

7. The interface circuit of claim 1, wherein the first processor is a main processing unit and the second processor is an auxiliary processing unit, the main processing unit having an access priority to the memory greater than an access priority of the auxiliary processing unit, the timer circuit further configured to associate a countdown time interval of an operation of the main processing unit to be greater than a countdown time interval of an operation of the auxiliary processing unit.

8. The interface circuit of claim 1, wherein the countdown time interval is a programmable value.

9. A method for managing access to a memory shared between a first processor and a second processor using an interface circuit, the method comprising:
determining that a first request to access the memory is originating from the first processor;
initializing the interface circuit to allow the first processor to access the memory and to prevent the second processor from accessing the memory;
receiving a second request from the second processor to access the memory during an execution of a programming and erase subroutine by the first processor;
initiating a countdown time interval during which the second processor is notified that the second request is accepted and the second request is placed in a state of suspension until an end of the countdown time interval; and
initializing the interface circuit to allow the second processor to access the memory based on determining the end of the countdown time interval and a successful suspension of the execution of the programming and erase subroutine by the first processor.

10. The method of claim 9, wherein the countdown time interval is a first countdown time interval, the method further comprising:
initiating a second countdown time interval at the end of the first countdown time interval, the second processor executing a second programming and erase subroutine until the end of the second countdown time interval; and
initializing the interface circuit to allow the first processor to resume access to the memory to resume execution of the suspended programming and erase subroutine by the first processor based on determining the end of the second countdown time interval.

11. The method of claim 10, further comprising programming the first countdown time interval and the second countdown time interval based on a level of access priority associated with the first request and the second request.

12. The method of claim 10, wherein the first processor is a main processing unit and the second processor is an auxiliary processing unit, the method further comprising programming the first countdown time interval to be greater than the second countdown time interval.

13. The method of claim 9, further comprising storing an address of the memory relating to the suspended programming and erase subroutine by the first processor in a pointer memory.

14. The method of claim 9, further comprising storing, in a support memory of the interface circuit, a binary state condition of the memory indicating whether the memory is being accessed by the first processor or the second processor.

15. A method for managing access to a memory shared between a first processor and a second processor, the method comprising:
allowing the first processor to access the memory and preventing the second processor from accessing the memory;
receiving a request from the second processor to access the memory;
initiating a first countdown time interval in response to the request, an access to the memory by the second processor is suspended during the first countdown time interval; and
initiating a second countdown time interval at an end of the first countdown time interval, the second processor allowed to access the memory and the first processor is prevented from accessing the memory during the second countdown time interval; and
resuming access to the memory by the first processor at the end of the second countdown time interval, the second processor prevented from accessing the memory at the end of the second countdown time interval.

16. The method of claim 15, further comprising storing information associated with an execution by the first processor and the second processor of a corresponding programming and erase subroutine in a support memory during a corresponding suspension of access to the memory.

17. The method of claim 15, wherein the first countdown time interval and the second countdown time interval are programmable countdown time intervals, the method further comprising programming the first countdown time interval and the second countdown time interval in accordance with an access priority level of the first processor and the second processor.

18. The method of claim 15, wherein the first processor is a main processing unit and the second processor is an auxiliary processing unit, the method further comprising programming the first countdown time interval to be greater than the second countdown time interval.

19. The method of claim 15, wherein the first countdown time interval and the second countdown time interval are programmable countdown time intervals, the method further comprising programming the first countdown time interval and the second countdown time interval in accordance with a type of operation to be executed by the first processor and the second processor.

20. The method of claim 15, wherein the first countdown time interval and the second countdown time interval are programmable countdown time intervals, the method further comprising programming the first countdown time interval and the second countdown time interval in accordance with a priority level of programming and erase subroutines to be executed by each of the first processor and the second processor.

* * * * *